United States Patent [19]

Kurokawa

[11] Patent Number: 4,595,166
[45] Date of Patent: Jun. 17, 1986

[54] VIBRATION ISOLATING TABLE DEVICE

[75] Inventor: Masahito Kurokawa, Yokohama, Japan

[73] Assignee: San-Ai Kogyo Kabushiki Kaisha, Tokyo, Japan

[21] Appl. No.: 757,113

[22] Filed: Jul. 19, 1985

[30] Foreign Application Priority Data

Mar. 19, 1985 [JP] Japan .................................. 60-53447

[51] Int. Cl.$^4$ .......................................... F16M 13/00
[52] U.S. Cl. .................................... 248/559; 188/267; 188/378; 248/550; 248/638
[58] Field of Search .................. 188/378, 267, 379; 248/559, 638, 562, 550

[56] References Cited

U.S. PATENT DOCUMENTS

| 2,347,969 | 5/1944 | Rubly et al. ..................... 188/378 X |
| 3,088,062 | 4/1963 | Hudimac ........................... 248/550 X |
| 3,690,414 | 9/1972 | Aggarwal et al. .................. 188/378 |
| 3,770,290 | 11/1973 | Bottalico ........................ 188/267 X |
| 4,314,623 | 2/1982 | Kurokawa ....................... 188/379 X |
| 4,328,941 | 5/1982 | Phillips et al. ...................... 248/550 |
| 4,371,141 | 2/1983 | Baratoff .............................. 248/569 |
| 4,483,425 | 11/1984 | Newman ............................. 188/378 |

Primary Examiner—Ramon S. Britts
Assistant Examiner—Ramon O. Ramirez
Attorney, Agent, or Firm—Jordan and Hamburg

[57] ABSTRACT

Disclosed is a vibration isolating table device in which a table body is supported on a base plate in the floating state through a vibration isolating device in order to isolate a tool or an instrument mounted on the table body from externally applied vibrations. In the vibration isolating table device, a magnetic plate and a magnet are respectively fixed on one and the other of mutually-opposite surfaces of the base plate and the table body so as to apply a force to the table body in the direction against an upward force applied to the table body by the vibration isolating device to thereby fix the table body. An end of a swing member is attached on the lower surface of the table body at the center portion thereof, and a weight is attached to the other end of the swinging member, so that the table body is caused to swing in response to an external force applied to the table body. This swing motion of the table body is subject to braking so as to be stopped in a moment by the vibration isolating device and the magnet.

5 Claims, 2 Drawing Figures

VIBRATION ISOLATING TABLE DEVICE

BACKGROUND OF THE INVENTION

1. Field of the Invention

The present invention relates to a vibration isolating table device for supporting a tool or an instrument, arranged so as not to transmit externally applied vibrations to the tool or the instrument, and particularly to a vibration isolating table device in which even if a support table is moved by an externally applied force, the motion of the support table is immediately stopped and the support table is held horizontally.

2. Description of Prior Art

Precision measuring instruments such as a microscope, a super-precision balance, or the like, can be easily vibrated not only by an externally applied vibration but also by air flow from an air conditioner, disturbance of air in room caused by breath or speaking sound of surrounding persons, or the like. If such a vibration is applied to such a precision measuring instrument, a maloperation may be generated. Accordingly, it is required to cut off or isolate various kinds of such vibrations. It has been tried to protect such a tool or an instrument from externally applied vibrations in such a manner that the tool or instrument is mounted on a vibration isolating table device. The vibration isolating table device is provided with a base plate supported by an elastic member made of a rubber or a synthetic resin material, a table body on which a tool or an instrument is mounted, and a vibration isolating means such as a magnet, a coil-spring, an air-spring, or the like, mounted on the base plate and for supporting the table body horizontally in the floating state. Accordingly, externally applied vibrations never be transmitted to the table body because the vibrations are cut off or absorbed by the elastic member and the vibration isolating means. However, the table body per se is provided with no means for limiting vibrations or displacement thereof. Therefore, if an external force is applied onto the precision measuring instrument or the table body, the table body may be vibrated or displaced, and it take several seconds, for example, about three seconds, for the table body to be stopped to be in the initial horizontal state through the floating support by the vibration isolating means. Therefore, there has been a disadvantage that in the case where a super-precision measuring instrument or the like was mounted on the table body, it was impossible to perform measurement before the table body was stopped when the table body was vibrated.

SUMMARY OF THE INVENTION

An object of the present invention is therefore to provide a vibration isolating table device in which even when an external force is applied to a table body, the movement of the table body can be stopped so that the table body is held horizontally immediately.

According to the present invention, the vibration isolating table device comprising a base plate having an upper and a lower surface, a table body having an upper and a lower surface and for supporting an object to be mounted on the upper surface thereof, a vibration isolating means provided on the upper surface of the base plate and for supporting the lower surface of the table body horizontally in a floating state, is featured in that the device further comprises a magnetic attraction means for attracting the table body toward the base plate against a floating force of the vibration isolating means, the magnetic attraction means being provided with a magnetic plate and a magnet means respectively provided on one and the other of the upper surface of the base plate and the lower surface of the table body such that the magnetic plate and the magnet means are in opposition to each other; and means for generating a swing motion in the table body in response to an external force directly applied to said table body, the swing motion generating means being provided with a swinging member with its one end attached on the lower surface of the table body at the center portion thereof and with its longitudinal axis extending perpendicularly to the surfaces of the table body, and a weight member attached at the other end of the swinging member.

In a preferred embodiment of the present invention, the base plate is supported at its lower surface by an elastic material such as rubber and an opening is formed at the center portion of the base plate so that the swing member is able to swing in the opening. The swing member is passed through the opening and extended below the base plate and the weight is constituted by a plate-like body having a surface substantially parallel to the lower surface of the base plate.

In the vibration isolating table device according to the present invention, if an external force is applied vertically or slantwise directly to the precision measuring instrument so as to move the table body, the swinging member and the weight of the swing motion generating means swing like a pendulum to cause the table body to swing. The table body is, however, supplied with an upward force by the vibration isolating means and a downward force by the magnet attraction means. Therefore, the upward swing motion and the downward swing motion of the table body are limited respectively by the magnet attraction means and by the vibration-isolating means. The pendulum action of the swing motion generating means is subject to braking to be stopped in a moment and the movement of the table body is also stopped. Even if a force is applied to the table body to move it horizontally, the center of gravity is lowered by the weight of the swing motion generating means, so that the horizontal movement of the table body is also converted into a swinging movement. The swinging movement is subject to braking to be stopped in a movement as described above.

The above and other objects, features, and advantages of the present invention will be more apparent from the following detailed description with respect to a preferred embodiment illustrated in the accompanying drawings.

DETAILED DESCRIPTION OF PREFERRED EMBODIMENTS

Figure 1:
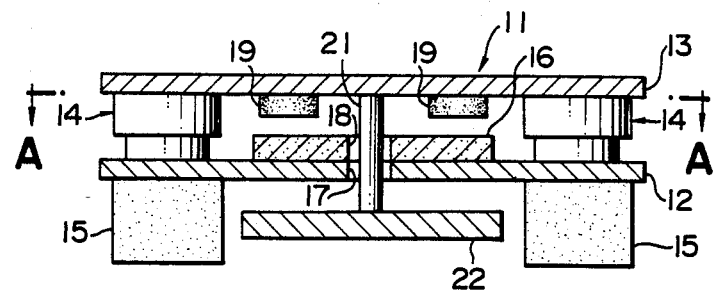
FIG. 1 is a vertical cross-section showing an embodiment of a vibration isolating table device according to the present invention.
Figure 2:
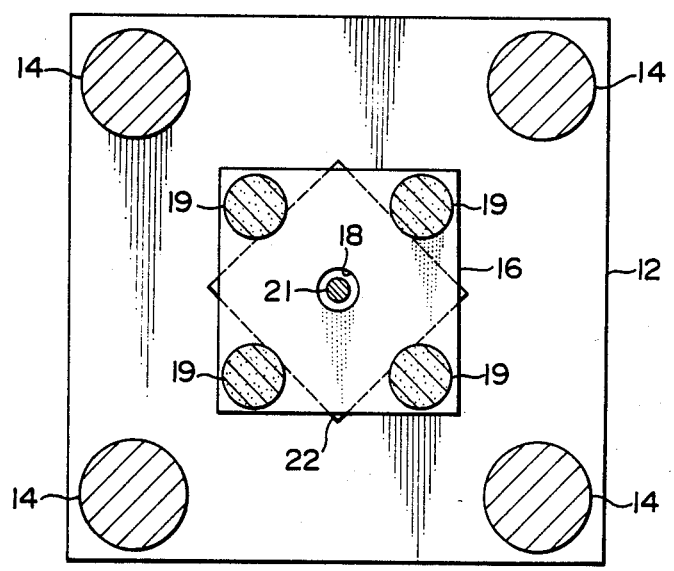
FIG. 2 is a plan view of the same taken on line A—A of FIG. 1.

Referring to FIGS. 1 and 2, a reference numeral 11 designates generally a vibration isolating table device. The vibration isolating table device 11 is provided with a rectangular base plate 12 having an upper and a lower surface, a table body 13 having an upper surface and a lower surface paralelly opposite to the upper surface of the base plate 12, and a vibration isolating means 14 including, for example, four units respectively attached at the four corners of the base plate 12 for supporting the table body 13 upward in a floating state. Each unit of the vibration isolating means 14 may be arranged such that an elastic member such as a coil spring, an air spring, or the like, is provided inside for supporting the table body 13 in the floating state by the elasticity thereof, or alternatively such that two permanent magnets are disposed inside so as to produce a magnetic repulsion force, one of the permanent magnets being supported in the floating state in order to support the table body 13. U.S. Pat. No. 4,314,623 filed by the same inventor as the inventor of this application and issued Feb. 9, 1982 discloses a vibration isolating device employing magnets. Elastic members 15 made of rubber or synthetic resin are attached on the lower surface of the base plate 12, so as to attenuate vibrations externally applied to the base plate 12.

A rectangular magnetic plate 16 is attached on the base plate 12 at the center portion of the upper surface thereof. Openings 17 and 18 are coaxially formed in the respective central portions of the base plate 12 and the magnetic plate 16. Four cylindrical permanent magnets 19 are attached on the lower surface of the table body 13 so as to respectively oppose to the four corners of the magnetic plate 16. That is, magnet attraction means is constituted by the magnetic plate 16 and the four permanent magnets 19. It is not always neccessary to arrange the permanent magnets 19 to oppose to the four corners of the magnetic plate 16 but the magnets 19 may be arranged in any way so long as they are disposed symmetrically with respective to the center of the table body 13. A shaft 21 is attached at its one or upper end onto the lower surface of the table body 13 at the center portion thereof. The other or lower end of the shaft 21 is passed through the openings 17 and 18 and projected down from the lower surface of the base plate 12. A weight 22 is attached on the shaft 21 at the lower surface thereof to constitute a swing motion means together with the shaft 21. The weight 22 is shaped in the form of a flat plate having a surface opposite to the lower surface of the substrate 12 with a certain distance therebetween and fixed at its center portion to the shaft 21.

Next, the operation will be described. Assume that measurument is being performed by suing a super-precision measuring instrument (not-shown) or the like mounted on the table body 13. Being attenuated by the elastic member 15 and at the same time being cut off by the vibration isolating means 14, vibrations produced on a working table (not-shown) or the like on which the vibration isolating table device 11 is mounted is never transmitted to the super-precision measuring instrument. Further assume that an external force is directly applied to the table body 13 to swing the latter. Due to the swinging of the table body 13, the weight 22 of the swing motion means is urged to swing like a pendulum with an amplitude made gradually smaller to make the shaft 21 stop at its vertical position so as to make the table body 13 horizontal. The table body 13 is, however, always supplied with a force magnetically attracting the table body downward by the magnetic plate 16 and the permanent magnets 19, and, at the same time, always supplied with an upward floating force opposed to the foregoing attracting force by the vibration isolating means 14, so that the pendulum action of the weight 22 is subject to braking in a moment and the table body 13 is caused to stop vibrating in an extremely short time, such as, about 0.1–0.3 seconds to be held horizontally.

Assume now that an external force is applied onto the table body 13 in the same direction as the surface, that is, horizontally, to urge the table body 13 to move horizontally. The center of gravity of the table body 13 is lowered to a position below the table body 13 by the weight 22 of the swing motion means, so that the movement of the table body 13 is converted into to a swing motion with the center of gravity as a fulcrum of the swing motion. Therefore, even if an external force is horizontally applied onto the table body 13, the table body 13 is swung and stopped in a moment by the action of the vibration isolating means and the magnet attraction means as described above.

Although the magnetic plate 16 is rectangular in the above-described embodiment, it may be in the form of disc, or alternatively, four magnetic plates may be disposed respectively in opposition to the permanent magnets 19. Alternatively, the magnetic plate 16 and the permanent magnet 19 may be attached respectively on the lower surface of the table body 13 and on the upper surface of the base plate 12.

While the present invention has been particularly shown and described with reference to a preferred embodiment thereof, it will be obvious for those skilled in the art that various changes in form and details can be made therein without departing from the spirit and scope of the present invention.

What is claimed is:

1. A vibration isolating table device comprising a base plate having an upper and a lower surface, a table body having an upper and a lower surface and for supporting an object to be mounted on the upper surface thereof, a vibration isolating means provided on the upper surface of said base plate and for supporting the lower surface of said table body horizontally in a floating state, the improvement comprising:

a magnetic attraction means for attracting said table body toward said base plate against a floating force of said vibration isolating means, said magnetic attraction means being provided with a magnetic plate and a magnet means respectively provided on one and the other of the upper surface of said base plate and the lower surface of said table body such that said magnetic plate and magnet means are in opposition to each other, said magnet means having a magnetic force substantially the same as the floating force of said vibration isolating means; and means for generating a swing motion in said table body in response to an external force directly applied to said table body, said swing motion generating means being provided with a swinging member with its one end attached on the lower surface of said table body at the center portion thereof and with its longitudinal axis extending perpendicularly to the surfaces of said table body, and a weight member attached on the other end of said swinging member.

2. A vibration isolating table device according to claim 1, in which said magnetic plate of said magnet attraction means is attached on the upper surface of said base plate at a central portion thereof, and in which said magnet means is constituted by a plurality of permanent magnets attached on the lower surface of said table body symmetrically with respective to the center of said magnetic plate.

3. A vibration isolating device according to claim 1, in which the other end of said swinging member of said swing motion generating means is passed through an opening formed in the center portion of said base plate and projected down from said base plate so that said weight is located below said base plate.

4. A vibration isolating table device according to claim 1, in which said weight of said swing motion generating means is constituted by a plate-like body having an upper and a lower surface parallel to the surfaces of said base plate, and in which the lower end of said swinging member is attached on the upper surface of said plate-like body at the center thereof.

5. A vibration isolating table device according to claim 2, in which said magnetic plate is rectangular and said permanent magnets are attached on the lower surface of said table body so as to be in opposition to four corners of said magnetic plate respectively.

* * * * *